UNITED STATES PATENT OFFICE.

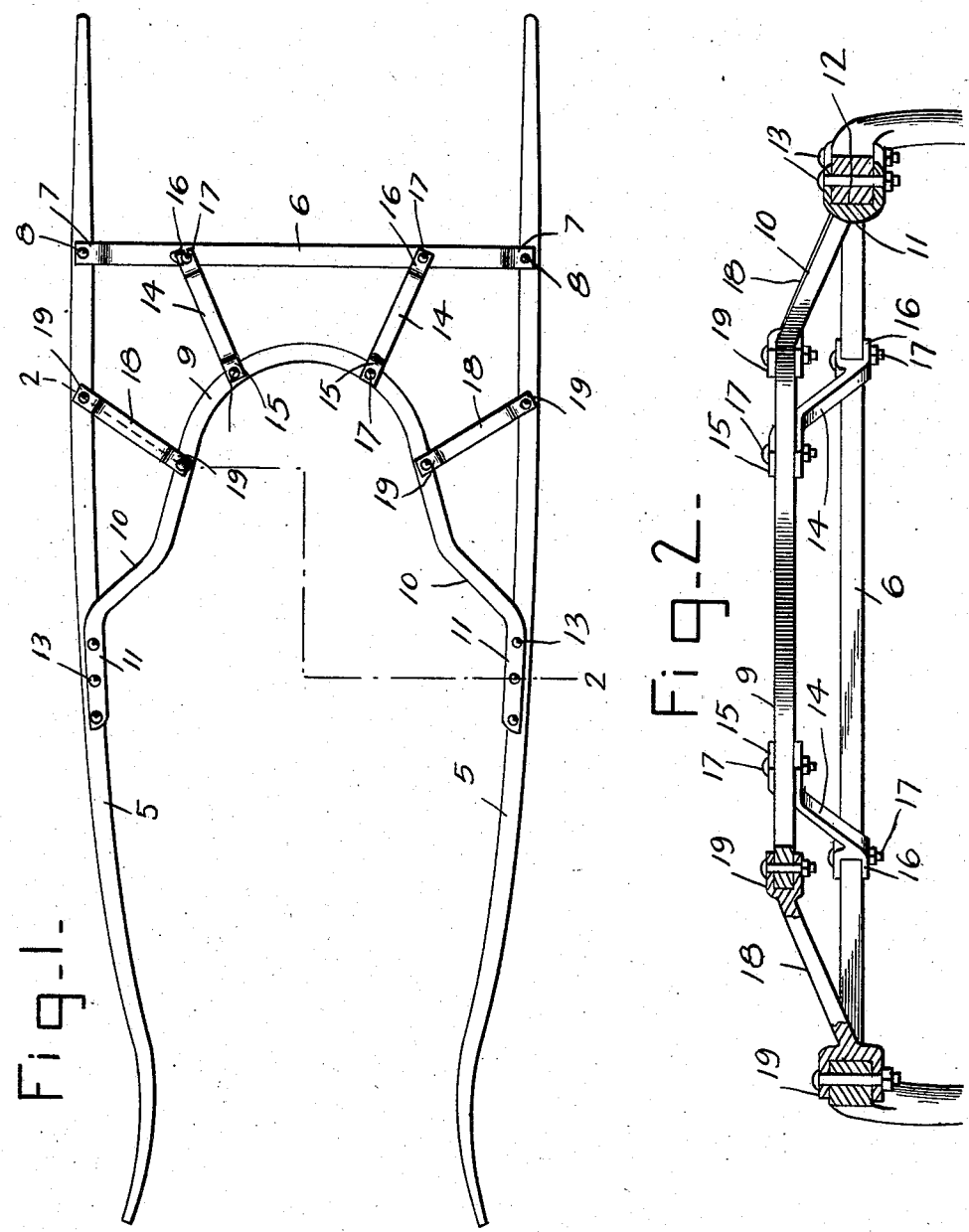

THOMAS B. BRADFORD, OF NEW MIDDLETON, TENNESSEE.

BREECHING DEVICE.

No. 868,072.    Specification of Letters Patent.    Patented Oct. 15, 1907.

Application filed March 4, 1907. Serial No. 360,411.

*To all whom it may concern:*

Be it known that I, THOMAS B. BRADFORD, a citizen of the United States, residing at New Middleton, in the county of Smith, State of Tennessee, have invented certain new and useful Improvements in Breeching Devices; and I do hereby declare the following to be a full, clear, and exact description of the invention, such as will enable others skilled in the art to which it appertains to make and use the same.

This invention relates to breeching devices and has for its primary object to do away with the harness breeches now in common use. Not only are such breeches unsafe but they only serve to irritate the horse in warm weather and to complicate the construction of the harness.

In carrying out my invention I provide a steel yoke which is connected at its ends to the shafts of a vehicle and serves as the breech for enabling the horse to hold back while traveling down hill.

Devices of this class heretofore devised have had the yoke connected with the shafts in some yieldable manner but as a connection of this kind is not essential to a proper working of the device, I have found that the rigid connection of the yoke with the shaft produces a very desirable construction both as regards the operation of the device and particularly as regards the durability of the same.

In the accompanying drawings, Figure 1 is a top plan view, and, Fig. 2 is a detail vertical sectional view therethrough, on the line 2—2 of Fig. 1.

Referring more specifically to the drawings the numeral 5 indicates a pair of shafts which in themselves are of the usual construction and 6 a cross bar which extends from one to the other of the shafts and this cross bar is preferably formed of bar metal which is rectangular in cross section and which has its ends of yoke formation as indicated at 7 to receive the shafts, there being a bolt 8 engaged through the arms of the yoke and through the shaft at each end of the bar to secure the bar at its ends to the shafts.

The breech member or yoke of my device comprises a bar of metal which is bent to form a yoke portion 9 and has its end portion bent laterally and forwardly as at 10 and thence directed forwardly as at 11, these last named portions being channeled in their outer faces as at 12 so as to fit partly over the respective shafts, there being bolts 13 engaged through the upper and lower portions forming the grooves and through the said shafts. By thus locating the bolts 13, no bolts are exposed so as to rub the horse and as a matter of fact the extreme end portion of the ends 11 are tapered so that they merge into the shaft, this taper being a gradual one. The yoke does not extend rearwardly as far as the cross bar 6 but brace bars 14 have their front and rear ends of yoke formation as indicated at 15 and 16 to fit respectively over the yoked portion of the breech iron 9 and the cross bars 6, being secured in this relation by means of bolts 17. These brace bars serve effectually to relieve the bolts 13 of any strain due to the holding back of the animal while traveling down hill and in order to further brace the breech iron, I provide brace bars 18 which have their ends of yoke formation as indicated at 19 and engaged in the same manner as the bars 14, with the yoke portion 9 and with the corresponding shafts.

Although I have illustrated the breech iron and also its braces as being of bar metal and rectangular in cross section, it will be understood of course that it will be entirely within the province of my invention to form them of hollow rectangular tubing, hollow cylindrical tubing, or of flat bar metal, the structure remaining the same.

What is claimed is—

The combination with a pair of shafts, of a cross bar having its ends of yoke formation and partly embracing the shafts, bolts engaged through the spaced portions of the yoke ends of the bars and through the shafts, a breech iron comprising a bar bent to form a yoke, the spaced portions of which at their forward ends are turned laterally and forwardly and thence directly forwardly, the last named forwardly directed portions of the portions of the spaced members of the yoke being channeled in their outer edges to partly receive portions of the inner edges of the shafts, bolts engaged through the channeled portions of the breech iron and through the shafts, brace bars having ends of yoke formation to partly embrace the cross bar at opposite sides of its middle and the breech iron also at opposite sides of its middle, and brace bars having ends of yoke formation to partly embrace the breech iron and also to partly embrace the shafts.

In testimony whereof, I affix my signature, in presence of two witnesses.

THOMAS B. BRADFORD.

Witnesses:
E. H. BAIRD,
R. M. BAIRD.